United States Patent [19]
Sekita

[11] Patent Number: 5,103,343
[45] Date of Patent: Apr. 7, 1992

[54] VARIABLE MAGNIFICATION LENS OF REAR FOCUS TYPE

[75] Inventor: Makoto Sekita, Tokyo, Japan

[73] Assignee: Canon Kabushiki Kaisha, Tokyo, Japan

[21] Appl. No.: 742,405

[22] Filed: Aug. 8, 1991

[30] Foreign Application Priority Data

Aug. 27, 1990 [JP] Japan .................. 2-226024

[51] Int. Cl.$^5$ .................. G02B 15/00
[52] U.S. Cl. .................. 359/684; 359/740
[58] Field of Search .................. 350/423, 427

[56] References Cited

U.S. PATENT DOCUMENTS

| | | | |
|---|---|---|---|
| 4,690,513 | 9/1987 | Takahashi, et al. | 359/687 X |
| 4,770,511 | 9/1988 | Yonezawa, et al. | 359/693 |
| 4,840,469 | 6/1989 | Moriyama | 359/685 X |
| 4,854,684 | 8/1989 | Horiuchi | 359/687 |
| 4,892,397 | 1/1990 | Horiuchi | 359/683 X |
| 4,984,876 | 1/1991 | Hata et al. | 350/423 |
| 4,991,942 | 2/1991 | Fujibayashi et al. | 359/690 |

FOREIGN PATENT DOCUMENTS 64-79716  3/1989  Japan .

Primary Examiner—Bruce Y. Arnold
Assistant Examiner—Rebecca D. Gass
Attorney, Agent, or Firm—Fitzpatrick, Cella, Harper & Scinto

[57] ABSTRACT

A zoom lens is disclosed comprising, in the order from the object side, a first lens unit having a positive refractive power, a second lens unit having a negative refractive power, a stop and a third lens unit having a positive refractive power, zooming being performed by moving the second lens unit along an optical axis and focusing being performed by moving the third lens unit, the zoom lens satisfying the following conditions;

$$-0.6 < \beta_{3T} < -0.35$$

$$0.124 < D_T/f_T < 0.211$$

where $\beta_{3T}$ is the image magnification of the third lens unit for an infinitely distant object in the telephoto end, $D_T$ is the separation between the stop and the third lens unit in the telephoto end and $f_T$ is the focal length of the entire lens system in the telephoto end.

2 Claims, 6 Drawing Sheets

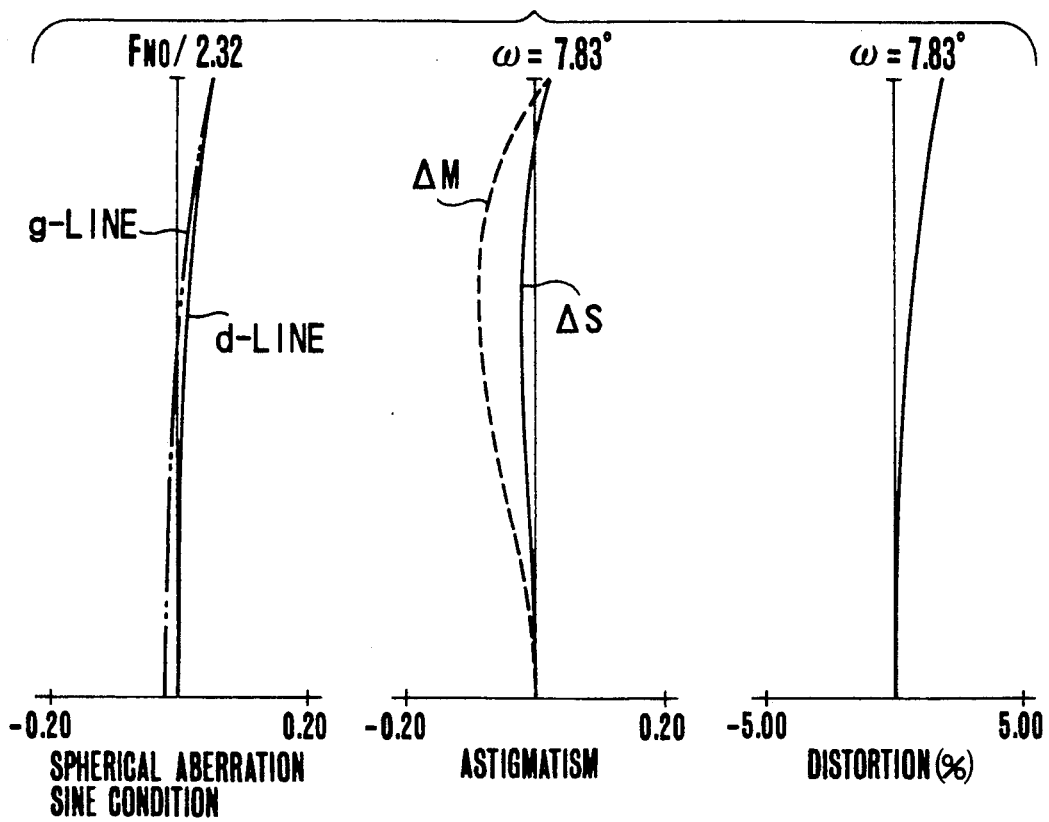

VARIABLE MAGNIFICATION LENS OF REAR FOCUS TYPE

BACKGROUND OF THE INVENTION

1. Field of the Invention

This invention relates to zoom lenses suited to silver-halide cameras, video cameras, still video cameras, etc. and, more particularly, to zoom lenses of the rear focus type.

2. Description of the Related Art

Recently, in the midst of having it demanded to make a minimization of the bulk and size of the entirety of the camera, as the rate at which the photographic lens occupies the camera is relatively large, to make the bulk and size of the photographic lens to a compact form is becoming exigent. The prior-known common zoom lens performs focusing by moving the first lens unit which is positioned nearest to the object side. If this type is employed, the diameter of the first lens unit is in the tendency to increase when focusing on even shorter object distances, because the diameter of the first lens unit is determined so as not to mutilate the off-axial light beam in the wide-angle end for the closest object. This has laid limitations on the making of the compact form.

To solve such a problem, a technique is produced that a lens unit disposed behind the variator lens is made to move when focusing is performed. Many zoom lenses of the so-called rear focus type have been proposed.

For example, in Japanese Laid-Open Patent Application No. Sho 64-79716, there is proposed a zoom lens of the rear focus type constructed from a positive first lens unit, when counted from the object side, a negative second lens unit and a positive third lens unit, zooming being performed by moving the second lens unit and the third lens unit and focusing being performed by moving the third lens unit.

However, the zoom lens of the 3-unit structure disclosed by the above publication has a drawback in that, despite employment of the rear focus type, if focusing is performed on an object at the minimum distance, mechanical interference is caused to occur.

SUMMARY OF THE INVENTION

In view of the above-described problem, a first object of the invention is to provide a zoom lens capable of close-up photography. Another or second object is to provide a zoom lens which, though having a high zoom ratio, is well corrected for variation of aberrations with zooming.

According to the invention, the zoom lens of the rear focus type comprises, in the order from the object side, a first lens unit having a positive refractive power, a second lens unit having a negative refractive power, a stop and a third lens unit having a positive refractive power, variation of the magnification being performed by moving the second lens unit along an optical axis, and focus adjustment being performed by moving the third lens unit, and that, letting the image magnification of the third lens unit for an infinitely distant object in the telephoto end be denoted by $\beta_{3T}$, the separation between the stop and the third lens unit in the telephoto end by $D_T$, and the focal length of the entire lens system satisfied:

$$-0.6 < \beta_{3T} < -0.35 \quad (1)$$

$$0.124 < D_T/f_T < 0.211 \quad (2)$$

BRIEF DESCRIPTION OF THE DRAWINGS

FIGS. 4(A), 4(B) and 4(C), FIGS. 5(A), 5(B) and 5(C) and FIGS. 6(A), 6(B) and 6(C) show graphs of the various aberrations of the numerical examples 1 to 3 according to the invention.

In the aberration graphs, FIGS. 4(A), 5(A) and 6(A) show the graphs of the various aberrations in the wide-angle end, FIGS. 4(B), 5(B) and 6(B) in the intermediate, and FIGS. 4(C), 5(C) and 6(C) in the telephoto end. Also, d stands for the d-line and g for the g-line. $\Delta M$ represents the meridional image surface and $\Delta S$ represents the sagittal image surface

DETAILED DESCRIPTION OF THE PREFERRED EMBODIMENTS

Figure 1:
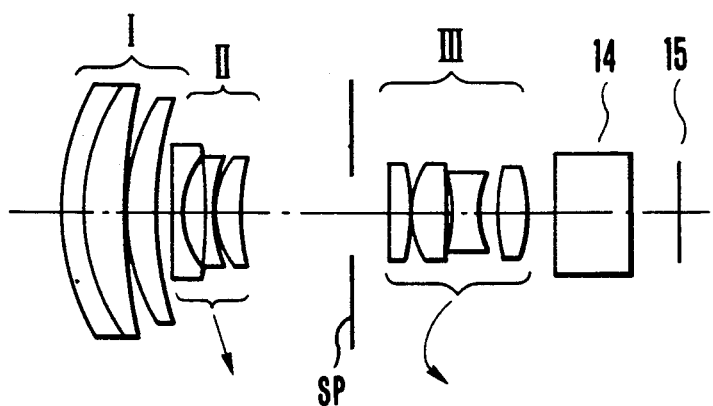
FIG. 1 to FIG. 3 show zoom lenses according to the invention, being lens sectional views of numerical examples 1 to 3.
Figure 2:
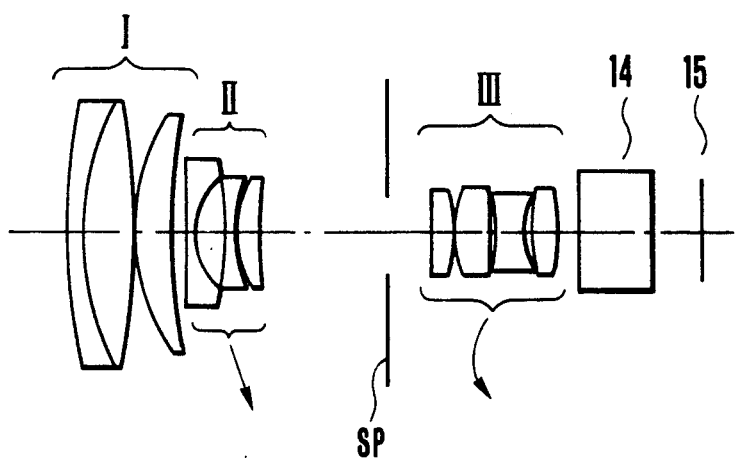
Figure 3:
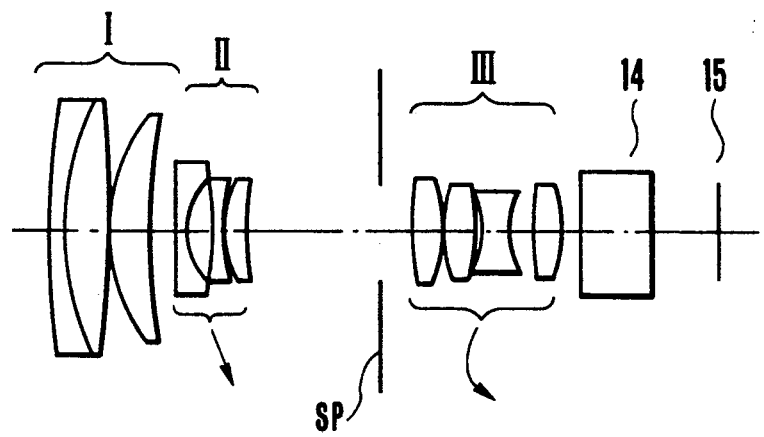
Figure 4A:
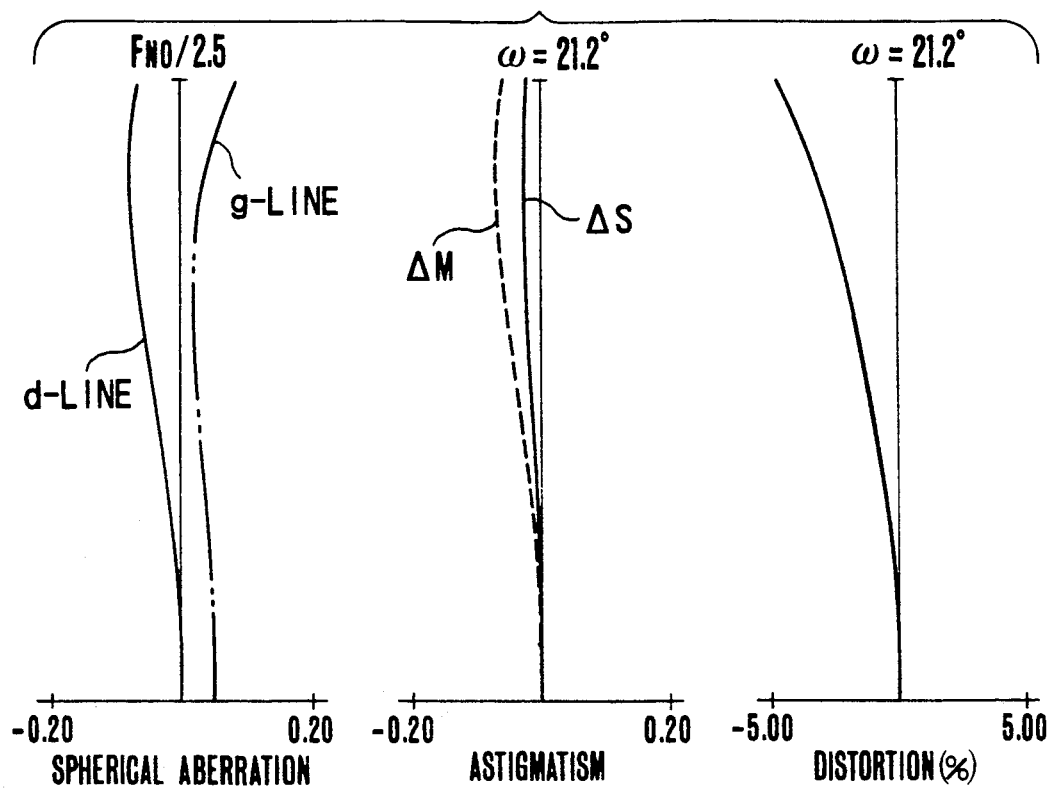
Figure 4B:
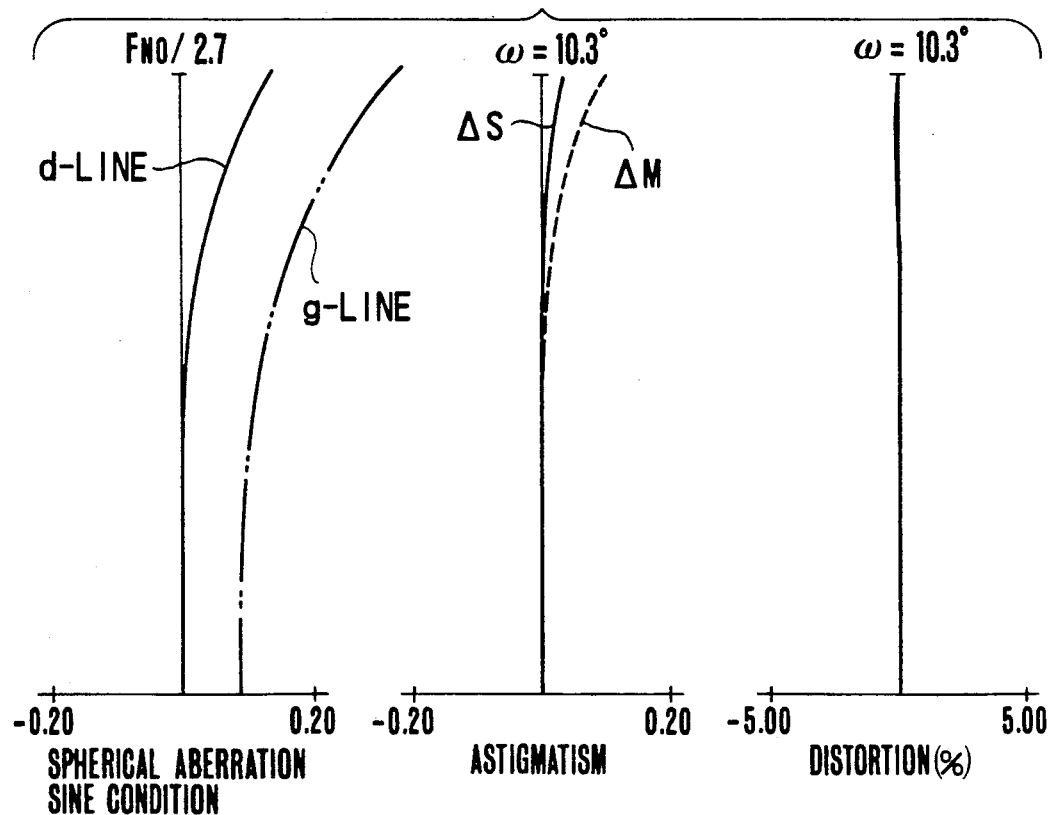
Figure 4C:
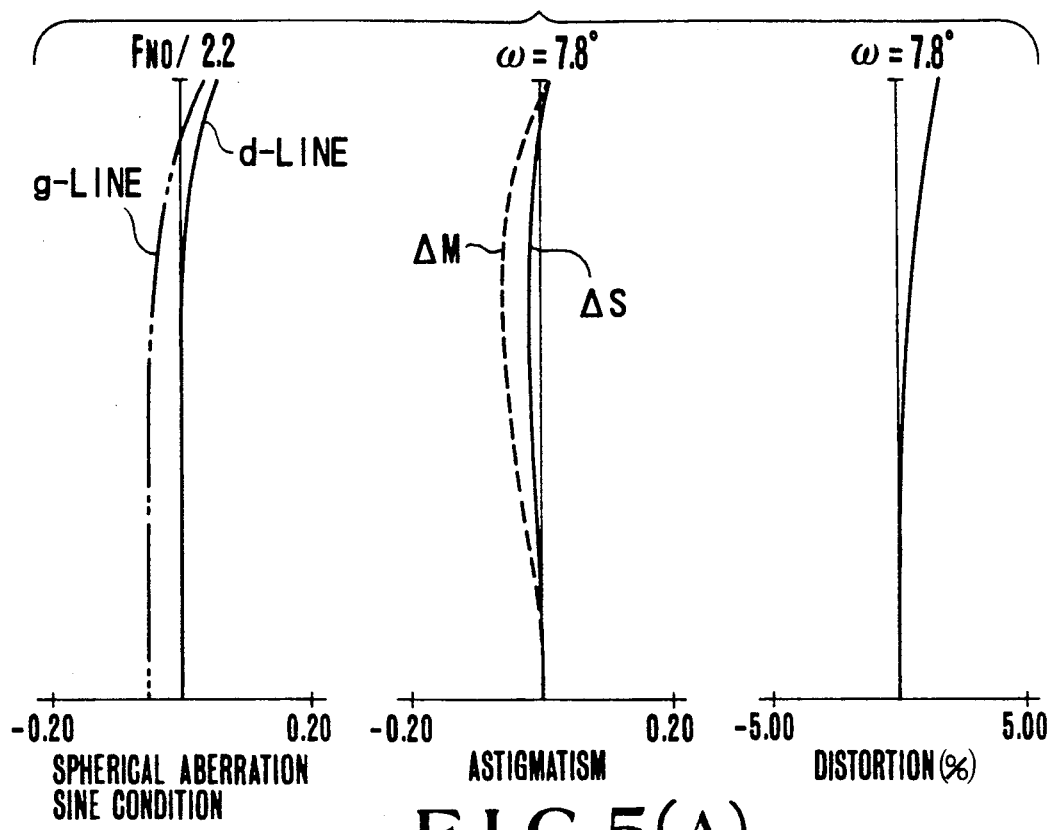
Figure 5A:
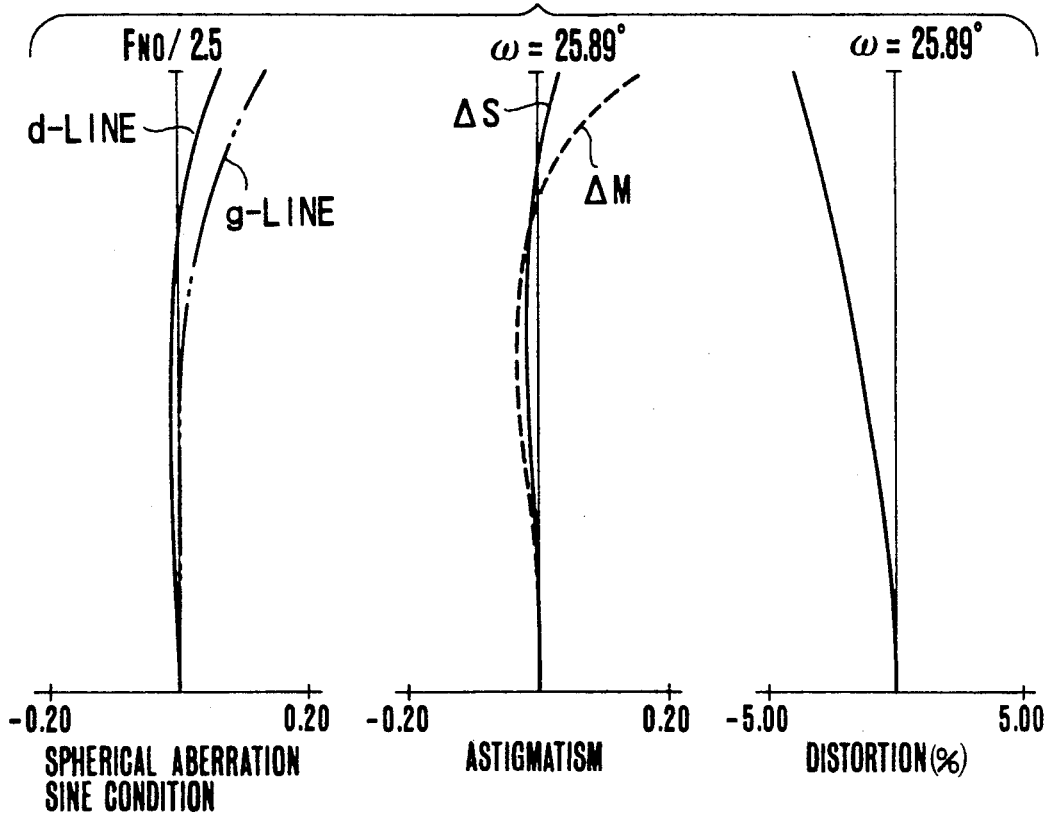
Figure 5B:
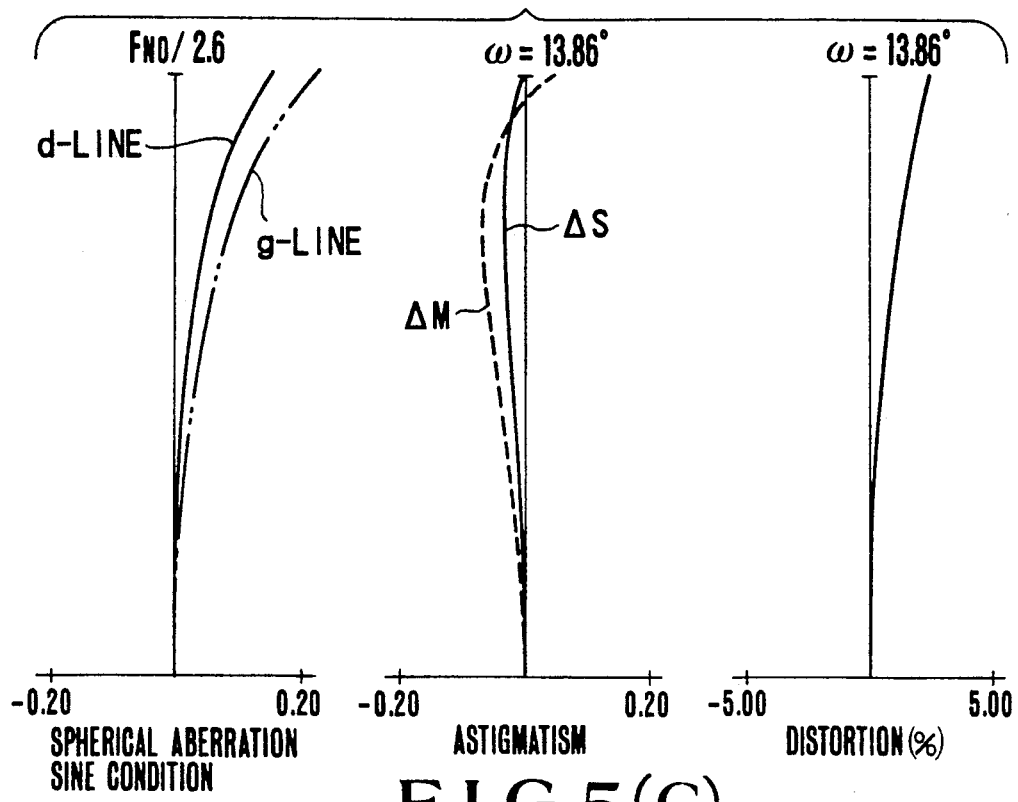
Figure 5C:
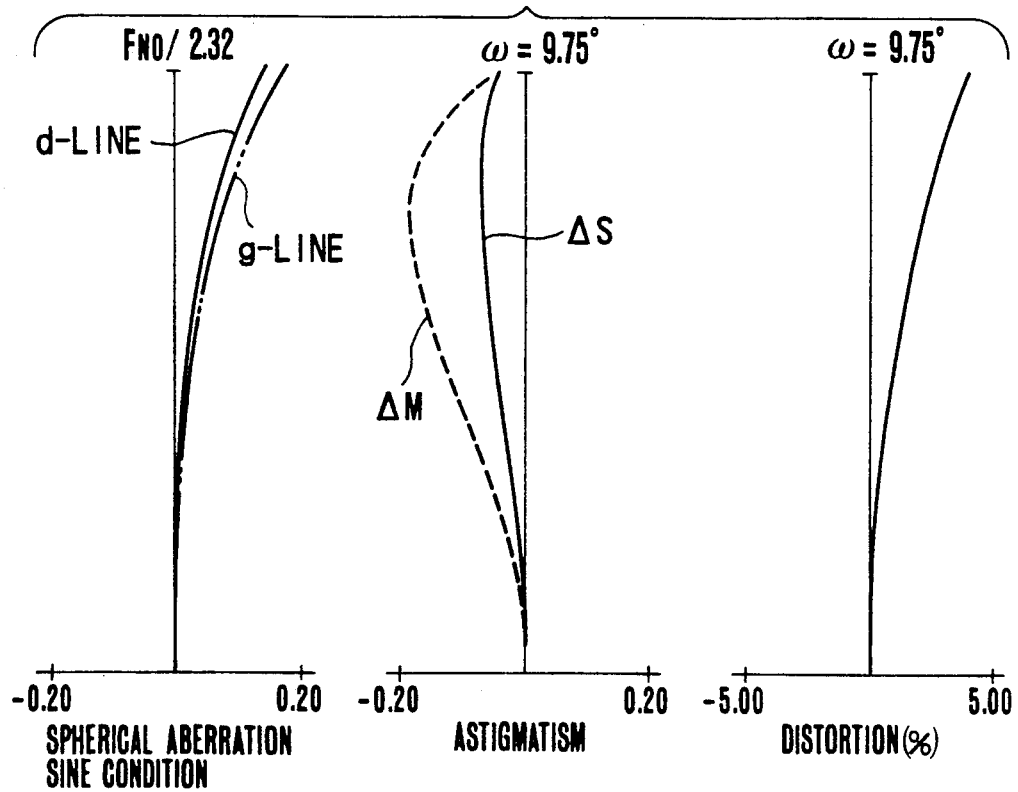
Figure 6A:
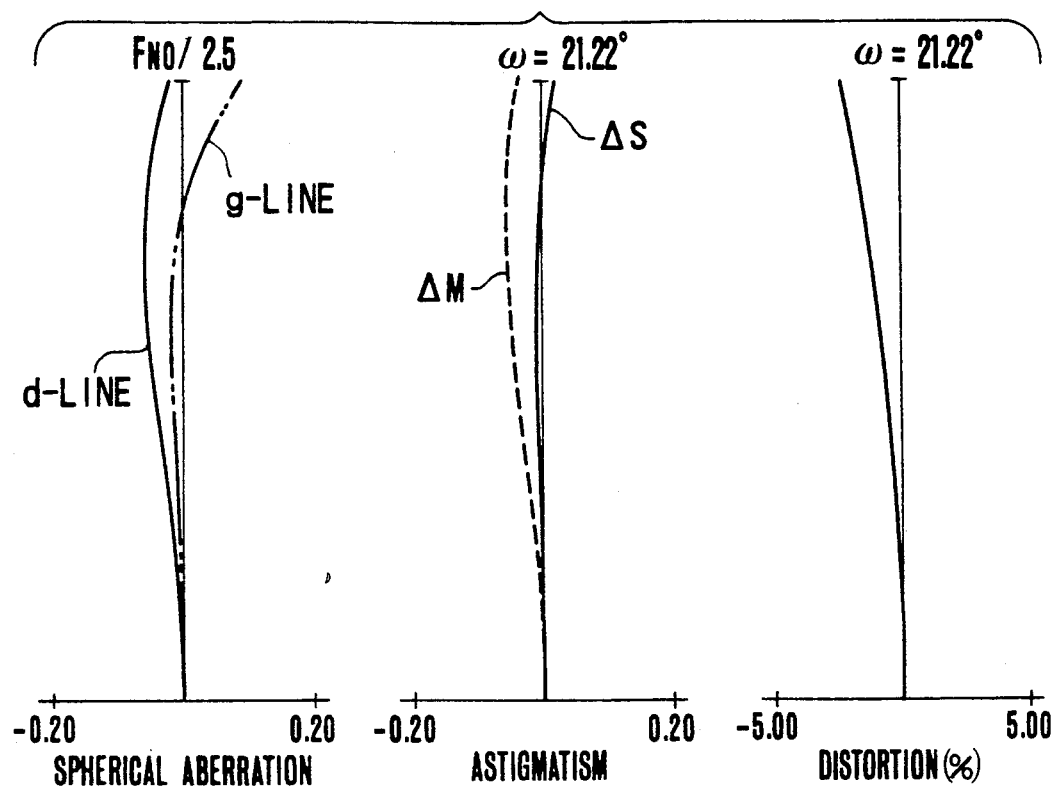
Figure 6B:
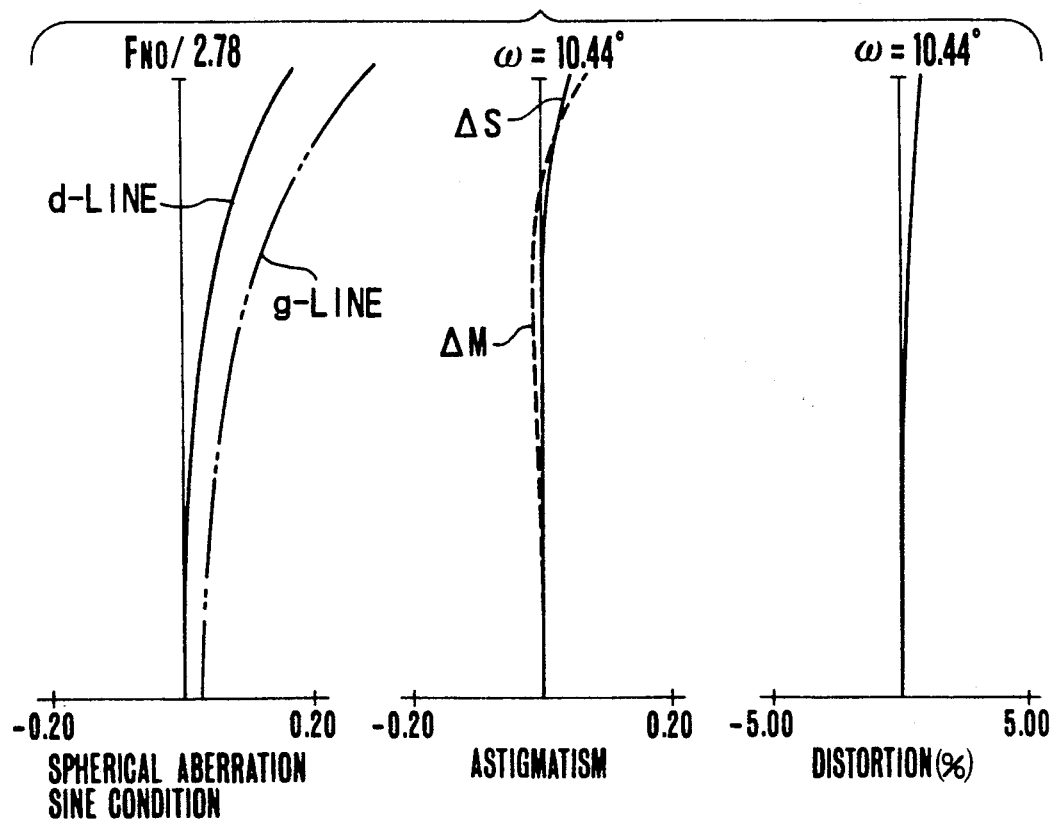

FIG. 1 to FIG. 3 show longitudinal section views of zoom lenses of the 3-unit structure of numerical examples 1 to 3 to be described later. In the same figures, I denotes the first lens unit having a positive refractive power and fixed in position; II the second lens unit having a negative refractive power; III the third lens unit having a positive refractive power; 14 a correction plate such as a quartz filter or an infrared cut filter; and 15 an image plane. SP stands for the stop that determines F-numbers.

In the present invention, the first lens unit is made to have a positive refractive power in order that the amount of movement for zooming of the second lens unit is set to a small one compared with the case where the first lens unit is of negative refractive power. Accordingly, the lens structure having a compact form can be realized. Also, the second and third lens units are made to have negative and positive refractive powers respectively in order that the magnification varying function is shared in each lens unit to suppress the amount of variation of aberrations of each lens unit.

Moreover, in the present invention, it is made possible to extend the focusing range to ever shorter object distances and also to suppress the variation of aberration during variation of the magnification. For these purposes, the above-described conditions (1) and (2) are set forth.

The inequalities of condition (1) are a rule of determining the image magnification of the third lens unit for an infinitely distant object in the telephoto end When the upper limit is exceeded, astigmatism varies to a large extent in zooming. In addition, the total length and the first lens unit both become large. These are objectionable. When the lower limit is exceeded, distortion varies to a large extent in zooming. Also, if an attempt has been made to secure hold of the necessary, sufficient closest focusing distance, the image magnification of the third lens unit approaches unit magnification in the telephoto end, making it impossible to perform focusing.

The inequalities of condition (2) are a condition in which the separation between the stop and the third lens unit is determined. When the upper limit is exceeded, it becomes easier to perform focusing even on an object at the minimum distance, but the total length tends to become long. So, it is objectionable. When the lower limit is exceeded, it is advantageous to facilitate minimization of the size, but if focusing is performed on the closest object, mechanical interference with the stop occurs. Thus, it becomes impossible to perform focusing on a sufficiently close object.

By satisfying the foregoing conditions, the objects of the invention can be accomplished. In addition, preferably, the following conditions may be satisfied. That is, letting the focal lengths of the first and second lens units be denoted by $f_1$ and $f_2$ respectively and the focal length of the entire lens system in the wide-angle end by fw, the following conditions are satisfied:

$$1.95 < f_1/fw < 3.75 \quad (3)$$

$$-1.2 < f_2/fw < -0.7 \quad (4)$$

The inequalities of condition (3) are a condition for the lens units subsequent to the first lens unit to take a proper power arrangement. When the upper limit is exceeded, the total length of the lens increases and, in connection with the range of the inequalities of condition (2), the powers of the subsequent lens units become strong in order to get security of the zoom ratio and focal lengths. Therefore, good correction of aberrations cannot be carried out. Also when the lower limit is exceeded, distortional aberration of the pincushion type increases in the telephoto end and spherical aberration becomes over-corrected. So, it is objectionable.

The inequalities of condition (4) are to regulate the refractive power of the second lens unit. When the refractive power of the second lens unit is strengthened in excess of the upper limit, it becomes difficult to lessen the aberration variation due to zooming. Also when the lower limit is exceeded, the amount of movement of the second lens unit must be increased in order to obtain the predetermined zoom ratio. Because the total length of the lens increases, it is objectionable.

Further, in the zoom lens of the present embodiment, in order to suppress the amount of variation of aberrations due to zooming in each lens unit to as small a one as possible, when the aberration correction is carried out by the structure of the three lens units, it is preferred that the second lens unit is constructed with three lenses, i.e., when counted from the object side, a negative lens having a strong concave surface facing the image side, a bi-concave lens, a positive lens having a strong convex surface facing the object side, and the third lens unit is constructed with four lens units, i.e., when counted from the object side, a positive lens, a positive lens having a strong convex surface facing the object side, a negative lens having a strong concave surface facing the image side and a bi-convex lens. By this arrangement, in the second lens unit, variation mainly of distortional aberration and comatic aberration and, in the third lens unit, variation mainly of spherical aberration and field curvature, are corrected.

Next, numerical examples 1 to 3 of the invention are shown. In the numerical examples 1 to 3, Ri is the radius of curvature of the i-th lens surface, when counted from the object side, Di is the i-th lens thickness and air separation, when counted from the object side, and Ni and vi are respectively the refractive index and Abbe number of the glass of the i-th lens, when counted from the object side. R21 and R22 show an infrared cut filter as the optical LPF.

NUMERICAL EXAMPLE 1 (FIGS. 1, 4(A), 4(B) AND 4(C))

| F = 10.3 − 29.1 | FNo = 1:2.5 − 2.2 | 2ω = 42.4° − 15.7° | | |
|---|---|---|---|---|
| R1 = 23.819 | D1 = 1.20 | N1 = 1.80518 | ν1 = 25.4 | |
| R2 = 17.295 | D2 = 3.80 | N2 = 1.60311 | ν2 = 60.7 | I |
| R3 = 73.356 | D3 = 0.15 | | | |
| R4 = 20.759 | D4 = 2.80 | N3 = 1.77250 | ν3 = 49.6 | |
| R5 = 55.200 | D5 = Variable | | | |
| R6 = 1809.437 | D6 = 0.80 | N4 = 1.83481 | ν4 = 42.7 | |
| R7 = 7.259 | D7 = 2.16 | | | |
| R8 = −72.686 | D8 = 0.80 | N5 = 1.80400 | ν5 = 46.6 | II |
| R9 = 32.827 | D9 = 0.15 | | | |
| R10 = 11.764 | D10 = 1.90 | N6 = 1.84666 | ν6 = 23.9 | |
| R11 = 20.831 | D11 = Variable | | | |
| R12 = Stop | D12 = Variable | | | |
| R13 = 67.738 | D13 = 2.00 | N7 = 1.83400 | ν7 = 37.2 | |
| R14 = −19.127 | D14 = 0.15 | | | |
| R15 = 6.988 | D15 = 2.50 | N8 = 1.62299 | ν8 = 58.1 | |
| R16 = 69.322 | D16 = 0.25 | | | III |
| R17 = −77.585 | D17 = 2.60 | N9 = 1.84666 | ν9 = 23.9 | |
| R18 = 6.264 | D18 = 1.95 | | | |
| R19 = 16.826 | D19 = 2.00 | N10 = 1.77250 | ν10 = 49.6 | |
| R20 = −23.952 | D20 = Variable | | | |
| R21 = ∞ | D21 = 6.00 | N11 = 1.51633 | ν11 = 64.1 | |
| R22 = ∞ | | | | |

$f_I = 26.82$  $bf = 4.36$
$f_{II} = -8.24$
$f_{III} = 11.65$

| | Variable separation | | | |
|---|---|---|---|---|
| Focal Length | D5 | D11 | D12 | D20 |
| 10.30 | 0.79 | 11.05 | 1.67 | 2.80 |
| 22.08 | 6.84 | 5.00 | 0.72 | 3.75 |
| 29.10 | 10.54 | 1.3 | 3.87 | 0.60 |

NUMERICAL EXAMPLE 2 (FIGS. 2, 5(A), 5(B) AND 5(C))

F = 8.24 − 23.28  FNo = 1:2.5 − 2.32  2ω = 51.79° − 19.50°

| | | | | |
|---|---|---|---|---|
| R1 = 69.504 | D1 = 1.20 | N1 = 1.80518 | ν1 = 25.4 | ⎫ |
| R2 = 21.499 | D2 = 4.20 | N2 = 1.51633 | ν2 = 64.1 | ⎬ I |
| R3 = −74.050 | D3 = 0.15 | | | ⎪ |
| R4 = 17.198 | D4 = 3.00 | N3 = 1.77250 | ν3 = 49.6 | ⎭ |
| R5 = 61.259 | D5 = Variable | | | |
| R6 = −1418.696 | D6 = 0.80 | N4 = 1.77250 | ν4 = 49.6 | ⎫ |
| R7 = 6.448 | D7 = 2.41 | | | ⎪ |
| R8 = −133.744 | D8 = 0.80 | N5 = 1.77250 | ν5 = 49.6 | ⎬ II |
| R9 = 15.064 | D9 = 0.15 | | | ⎪ |
| R10 = 10.396 | D10 = 1.80 | N6 = 1.84666 | ν6 = 23.9 | ⎭ |
| R11 = 43.858 | D11 = Variable | | | |
| R12 = Stop | D12 = Variable | | | |
| R13 = 111.454 | D13 = 2.00 | N7 = 1.83400 | ν7 = 37.2 | ⎫ |
| R14 = −17.483 | D14 = 0.15 | | | ⎪ |
| R15 = 6.762 | D15 = 2.40 | N8 = 1.60311 | ν8 = 60.7 | ⎪ |
| R16 = 685.757 | D16 = 0.50 | | | ⎬ III |
| R17 = −31.604 | D17 = 2.50 | N9 = 1.84666 | ν9 = 23.9 | ⎪ |
| R18 = 6.230 | D18 = 0.87 | | | ⎪ |
| R19 = 15.541 | D19 = 2.00 | N10 = 1.77250 | ν10 = 49.6 | ⎭ |
| R20 = −19.653 | D20 = Variable | | | |
| R21 = ∞ | D21 = 6.00 | N11 = 1.51633 | ν11 = 64.1 | |
| R22 = ∞ | | | | |

$f_I = 26$  $bf = 4.003$
$f_{II} = -8.854$
$f_{III} = 10.997$

| | Variable separation | | | |
|---|---|---|---|---|
| Focal Length | D5 | D11 | D12 | D20 |
| 8.24 | 0.97 | 11.38 | 2.98 | 1.80 |
| 16.21 | 7.02 | 5.33 | 2.52 | 2.27 |
| 23.28 | 10.84 | 1.51 | 4.24 | 0.54 |

NUMERICAL EXAMPLE 3 (FIGS. 3, 6(A), 6(B) AND 6(C))

F = 10.3 − 29.1  FNo = 1:2.5 − 2.32  2ω = 42.44° − 15.66°

| | | | | |
|---|---|---|---|---|
| R1 = 111.661 | D1 = 1.20 | N1 = 1.80518 | ν1 = 25.4 | ⎫ |
| R2 = 24.066 | D2 = 3.80 | N2 = 1.60311 | ν2 = 60.7 | ⎬ I |
| R3 = −91.735 | D3 = 0.15 | | | ⎪ |
| R4 = 18.137 | D4 = 2.80 | N3 = 1.83481 | ν3 = 42.7 | ⎭ |
| R5 = 50.183 | D5 = Variable | | | |
| R6 = −2132.657 | D6 = 0.80 | N4 = 1.77250 | ν4 = 49.6 | ⎫ |
| R7 = 6.976 | D7 = 2.29 | | | ⎪ |
| R8 = −502.571 | D8 = 0.80 | N5 = 1.81600 | ν5 = 49.6 | ⎬ II |
| R9 = 13.652 | D9 = 0.15 | | | ⎪ |
| R10 = 10.393 | D10 = 1.80 | N6 = 1.84666 | ν6 = 23.9 | ⎭ |
| R11 = 35.684 | D11 = Variable | | | |
| R12 = Stop | D12 = Variable | | | |
| R13 = 50.451 | D13 = 2.00 | N7 = 1.83400 | ν7 = 37.2 | ⎫ |
| R14 = −20.393 | D14 = 0.15 | | | ⎪ |
| R15 = 7.388 | D15 = 2.50 | N8 = 1.62299 | ν8 = 58.1 | ⎪ |
| R16 = −9776.203 | D16 = 0.31 | | | ⎬ III |
| R17 = −50.802 | D17 = 2.80 | N9 = 1.84666 | ν9 = 23.9 | ⎪ |
| R18 = 6.361 | D18 = 2.13 | | | ⎪ |
| R19 = 21.139 | D19 = 2.00 | N10 = 1.71299 | ν10 = 53.8 | ⎭ |
| R20 = −22.616 | D20 = Variable | | | |
| R21 = ∞ | D21 = 6.00 | N11 = 1.51633 | ν11 = 64.1 | |
| R22 = ∞ | | | | |

$f_I = 27.757$  $bf = 5.597$
$f_{II} = -8.616$
$f_{III} = 12.380$

| | Variable separation | | | |
|---|---|---|---|---|
| Focal Length | D5 | D11 | D12 | D20 |
| 10.30 | 2.41 | 11.39 | 3.41 | 1.80 |
| 21.71 | 8.46 | 5.34 | 2.03 | 3.18 |
| 29.10 | 12.29 | 1.52 | 4.81 | 0.40 |

The numerical values of each of the numerical examples 1 to 3 in relation to the inequalities of condition (1) to (4) are shown below:

| | Numerical Example | | |
|---|---|---|---|
| | 1 | 2 | 3 |
| (1) $\beta_{3T}$ | −0.41 | −0.39 | −0.483 |
| (3) $f_1/f_w$ | 2.6 | 3.155 | 2.695 |
| (4) $f_2/f_w$ | −0.8 | −1.075 | −0.837 |

-continued

| | Numerical Example | | |
|---|---|---|---|
| | 1 | 2 | 3 |
| (2) $D_T/f_T$ | 0.133 | 0.182 | 0.165 |

As has been described above, in the zoom lens of 3-lens unit structure having positive, negative and positive refractive powers, when counted from the object side, by setting the refractive power arrangement of the first lens unit and the second lens unit and the image magnification of the third lens unit in the telephoto end to proper values, it becomes possible to achieve a zoom lens of the rear focus type of a zoom ratio of about 3 at a high performance and still in compact form.

What is claimed is:

1. A zoom lens of the rear focus type comprising, in the order from an object side, a first lens unit having a positive refractive power, a second lens unit having a negative refractive power, a stop and a third lens unit having a positive refractive power, zooming being performed by moving said second lens unit along an optical axis, and focusing being performed by moving said third lens unit, wherein letting the image magnification of said third lens unit for an infinitely distant object in a telephoto end be denoted by $\beta_{3T}$, the separation between said stop and said third lens unit in the telephoto end by $D_T$, and the focal length of the entire lens system in the telephoto end by $f_T$, the following conditions are satisfied:

$$-0.6 < \beta_{3T} < -0.35$$

$$0.124 < D_T/f_T < 0.211.$$

2. A zoom lens according to claim 1, wherein letting the focal lengths of said first lens unit and said second lens unit be denoted by $f_1$ and $f_2$ respectively and the focal length of the entire lens system in a wide-angle end by $f_W$, the following conditions are satisfied:

$$1.95 < f_1/f_W < 3.75$$

$$-1.2 < f_2/f_W < -0.7.$$

* * * * *